United States Patent
Meier et al.

(10) Patent No.: US 9,911,248 B2
(45) Date of Patent: Mar. 6, 2018

(54) METHOD AND DEVICE FOR OPERATING A HYBRID DRIVE SYSTEM

(71) Applicant: Robert Bosch GmbH, Stuttgart (DE)

(72) Inventors: Frank Meier, Stuttgart (DE); Pascal Gladel, Ludwigsburg (DE); Bernd Kesch, Hemmingen (DE); Stephan Otto, Weissach (DE); Daniel Rieker, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 227 days.

(21) Appl. No.: 14/992,181

(22) Filed: Jan. 11, 2016

(65) Prior Publication Data
US 2016/0207518 A1 Jul. 21, 2016

(30) Foreign Application Priority Data
Jan. 15, 2015 (DE) .................. 10 2015 200 560

(51) Int. Cl.
| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |
| G07C 5/02 | (2006.01) |
| B60W 10/06 | (2006.01) |

(Continued)

(52) U.S. Cl.
CPC ............ *G07C 5/02* (2013.01); *B60K 6/48* (2013.01); *B60W 10/06* (2013.01); *B60W 10/08* (2013.01); *B60W 20/11* (2016.01); *B60W 20/15* (2016.01); *B60K 2006/4825* (2013.01); *B60W 20/16* (2016.01); *B60W 20/50* (2013.01); *G07C 5/08* (2013.01); *Y02T 10/54* (2013.01); *Y02T 10/6221* (2013.01); *Y02T 10/6252* (2013.01); *Y02T 10/6286* (2013.01); *Y10S 903/93* (2013.01)

(58) Field of Classification Search
CPC .......... G07C 5/02; G07C 5/08; B60W 20/11; B60W 20/15; B60W 20/16; B60W 20/50; B60W 10/06; B60W 10/08; B60K 6/48; B60K 2006/4825; Y02T 10/54; Y02T 10/6221; Y02T 10/6252; Y02T 10/6286; Y10S 903/93
USPC ......................................................... 701/22
See application file for complete search history.

(56) References Cited

FOREIGN PATENT DOCUMENTS

| | | |
|---|---|---|
| DE | 198 50 586 | 5/2000 |
| DE | 10 2005 018 270 | 10/2006 |
| DE | 10 2100 078 484 | 1/2013 |

*Primary Examiner* — Calvin Cheung
*Assistant Examiner* — Paula L Schneider
(74) *Attorney, Agent, or Firm* — Norton Rose Fulbright US LLP; Gerard Messina

(57) ABSTRACT

A method for operating a hybrid drive system which includes ascertaining an overall cost function that takes into account the cost function, which is a function of the operating point, for minimizing an energy usage of the hybrid drive system, and that takes into account one or more partial cost functions, which are a function of the operating point, which are each assigned to a requested special function; determining an optimized operating point of the hybrid drive system corresponding to an optimization according to the ascertained overall cost function; operating of the hybrid drive system at the operating point; and executing of those of the requested special functions for which the determined operating point is within an operating range assigned to the respective special function.

14 Claims, 1 Drawing Sheet

(51) Int. Cl.
*B60W 10/08* (2006.01)
*B60K 6/48* (2007.10)
*B60W 20/15* (2016.01)
*B60W 20/11* (2016.01)
*G07C 5/08* (2006.01)
*B60W 20/50* (2016.01)
*B60W 20/16* (2016.01)

METHOD AND DEVICE FOR OPERATING A HYBRID DRIVE SYSTEM

CROSS REFERENCE

The present application claims the benefit under 35 U.S.C. § 119 of German Patent Application No. DE 102015200560.7 filed on Jan. 15, 2015, which is expressly incorporated herein by reference in its entirety.

FIELD

The present invention relates to motor vehicles having hybrid drive systems, which are operated in particular according to an operating strategy that takes into account a minimization of energy use, and in addition take into account demands in accordance with further operating states or diagnoses.

BACKGROUND INFORMATION

For the operation of a hybrid drive system, the distribution of load between different drive units, or, in the case of an internal combustion engine as one of the drive units, its state of activation (start/stop operation), is permanently ascertained. The load distribution can for example be determined using an optimization method continuously carried out online, i.e., in the motor vehicle. Generally, the optimization method is optimized with regard to a minimization of an energy use or emissions output.

In particular, during operation of an internal combustion engine, it may be necessary in some driving situations, and/or with a particular frequency, to carry out special functions that require the assumption of special operating states. The special functions can include diagnostic functions, calibration functions, or component protection functions, and the like. When there are requests for the carrying out of special functions, such as for a carrying out of a catalytic converter heating operation or a sensor diagnosis, generally these have to be assumed within a particular period of time after the request is made.

It is true that for some requested operating states, such as a catalytic converter heating operation, possibilities are known for adapting the operation of a hybrid drive system, but a general inclusion of special function requests in the general method that provides an optimization of the energy usage for the determination of the load distribution has up to now not been possible.

German Patent Application No. DE 198 50 586 A1 describes a method for operating an internal combustion engine in which fuel is injected into a combustion chamber in at least two operating modes, and in which a changeover takes place between the operating modes as a function of a target operating mode, the target operating mode being ascertained from a plurality of operating mode requests. In particular, each of the operating mode requests can be assigned a priority, and the ascertaining of the target operating mode can be carried out as a function of the priorities of the operating mode requests.

German Patent Application No. DE 10 2005 018 270 A1 describes a method for controlling an internal combustion engine, the internal combustion engine being operated in an operating mode that is determined by an operating mode coordinator that selects, from among operating mode requests, the request having the highest priority that is not forbidden by other operating mode requests.

German Patent Application No. DE 10 2011 078 484 A1 describes a system for controlling a combustion state of an internal combustion engine, the system having a control unit that is set up to carry out a prioritization of requests for operating states on the basis of the present state of combustion, and to process the accordingly received requests in the sequence of their priorities.

SUMMARY

According to example embodiments of the present invention, a method is provided for operating a hybrid drive system, and a device and a hybrid drive system are provided.

According to a first aspect, an example method is provided for operating a hybrid drive system, having the following steps:

ascertaining an overall cost function that takes into account a cost function that is a function of the operating point for the minimization of an energy usage of the hybrid drive system and that takes into account one or more partial cost functions that are a function of the operating point, or that is a function of a cost function that is a function of the operating point for minimizing an energy usage of the hybrid drive system and of one or more partial cost functions that are a function of the operating point, each assigned to a requested special function;

determination of an optimized operating point of the hybrid drive system corresponding to an optimization in accordance with the ascertained overall cost function;

operation of the hybrid drive system at the operating point;

carrying out that one of the requested special functions for which the determined operating point is within an operating range assigned to the respective special function.

One example aspect of the above-indicated method is to expand a cost function for ascertaining an optimized operating point of a hybrid drive system based on a minimization of an energy usage in such a way that requests for the carrying out of special functions can be taken into account. Special functions are functions that are to be carried out, or should be carried out, during operation of the hybrid drive system in particular driving situations and/or in particular vehicle situations and/or with a particular frequency. The special functions may standardly require the operation of the hybrid drive system within a special operating range that standardly deviates from the operating point determined by the optimization.

The special functions can include diagnostic functions, calibration functions, component protection functions, and the like.

In order to create the overall cost function, each special function request is assigned a cost contribution in the form of partial costs whose amount relative to the original cost function is taken into account as reducing costs or increasing costs, and whose magnitude is a function of a priority of the correspondingly requested special function. By carrying out an optimization based on the overall cost function in which the overall costs are minimized, the carrying out of one or more special functions in an operating point of the hybrid drive system can result.

In this way, it is possible in driving operation to adapt the various special function requests in the selection of the operating point in order in this way to ensure an execution and a minimum frequency with which the requested special functions are carried out. In addition, the influence of the special functions to be carried out on the operating strategy of the minimization of the energy usage can be reduced, because advantageous operating states can preferably be selected for special function requests.

In addition, the operating point can be determined at least by a load distribution between drive units of the hybrid drive system, and in particular by a rotational speed of the hybrid drive system.

In particular, the requested special functions can be functions that are to be carried out during operation of the hybrid drive system in particular driving situations and/or in particular vehicle situations and/or with a particular frequency or regularity, and can include diagnostic functions and/or calibration functions and/or component protection functions and/or temperature adaptation functions for individual components.

According to further specific example embodiments, the special functions can include one or more of the following functions:
   a temporally optimized catalytic converter heating function that provides a fastest possible heating of a catalytic converter of an internal combustion engine while maintaining an emission limit;
   an emission-optimized catalytic converter heating function that provides a heating of a catalytic converter of the internal combustion engine while minimizing an emission of pollutants;
   a function for temperature adaptation of a lambda sensor before or after the catalytic converter;
   a catalytic converter heat-keeping function;
   a moment calibration function for calibrating the torques of the internal combustion engine;
   a catalytic converter diagnostic function for diagnosing the functional capacity of the catalytic converter;
   a lambda sensor diagnostic function for diagnosing the functional capacity of the lambda sensor;
   a mixture adaptation function;
   a thermostat diagnostic function and engine temperature sensor diagnostic function;
   a diagnostic function for recognizing misfires in a combustion in a cylinder of the internal combustion engine;
   a function for cylinder-specific air-fuel adaptation;
   a function for diagnosing the operation of a tank ventilation system for reducing outgassing emissions;
   a function for carrying out a leakage diagnosis of the tank system;
   a function for reducing a raw emission component, such as NOx;
   a function for reducing an emission component, such as NOx;
   a function for regeneration of a storage catalytic converter; and
   a function for regeneration of a filter, e.g. a particle filter.

It can be provided that the operating ranges of the hybrid drive system assigned to the special functions are determined by at least one of the following parameters: rotational speed range, load range, air mass range, operating states such as coasting operation or stop operation of the internal combustion engine.

In addition, the partial cost functions assigned to the special functions can be taken into account in the overall cost function in such a way that the resulting partial costs that are a function of the operating point reduce the overall costs resulting from the overall cost function.

According to a specific embodiment, the amount of the operating-point-dependent partial cost function of a special function can assume a value that is different from 0 and that reduces the overall costs for operating points within the one or more operating ranges assigned to the special function, and for operating points outside the one or more operating ranges assigned to the special function can assume the value of 0, or a value that increases the overall costs.

The ascertaining of the overall cost function and a determination of the optimized operating point can be carried out cyclically, a prespecified time duration assigned to the special function being carried out being first waited in particular before a new ascertaining of the overall cost function, the waiting in particular being interrupted if a change of load is requested that requires departure from the operating point of the hybrid drive system.

In particular, each special function can be assigned an item of information regarding parallel execution that indicates whether the corresponding functionality can be carried out in parallel with other requested special functions, or whether it excludes other requested special functions.

It is also possible for a plurality of special functions to be designated together as a new special function having its own costs. This makes sense in particular for special functions that are exclusive relative to one another and that have similar activation conditions. In this way, for example possible transient phenomena can be reduced.

It can be provided that, if the parallel execution information for one or more of the requested special functions indicates that these are to be carried out only exclusively, a sequence is determined of the execution of the special functions as a function of the operating-point-dependent partial costs assigned to the requested special functions.

In particular, the partial cost functions of the individual special functions can in each case be a function of the trip duration, of the operating duration of the internal combustion engine, and of an item of information as to whether the requested special function was taken into account in the last driving cycle.

In addition, the cost function can also take into account predictive state quantities.

According to a further aspect, a device is provided, in particular a hybrid control device, for operating a hybrid drive system, the device being fashioned to carry out the above method.

BRIEF DESCRIPTION OF THE DRAWINGS

In the following, specific embodiments are explained in more detail on the basis of the accompanying drawings.

DETAILED DESCRIPTION OF EXAMPLE EMBODIMENTS

Figure 1:
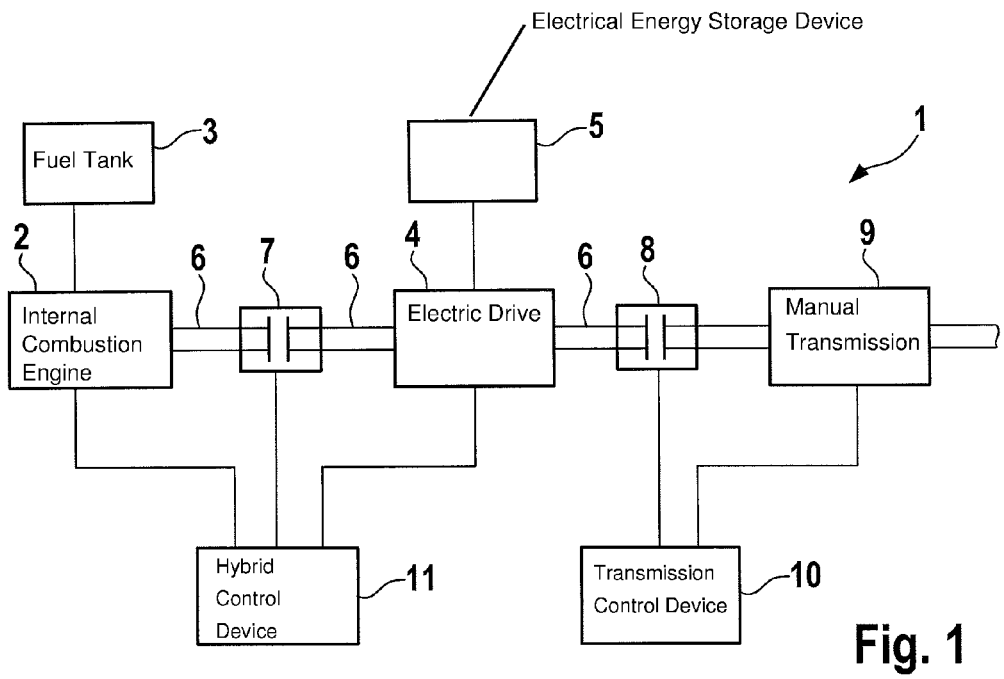
FIG. 1 shows a schematic representation of a hybrid drive system for motor vehicles.

FIG. 1 shows as an example a schematic representation of a drive system fashioned as hybrid drive system 1. Hybrid drive system 1 has a first drive unit that for example can be fashioned as an internal combustion engine 2. Internal combustion engine 2 is provided with chemical energy in the form of fuel that is stored in a fuel tank 3.

A second drive unit is provided that can be fashioned as an electric drive 4. For operation, electric drive 4 is provided with electrical energy from an electrical energy storage device 5.

Internal combustion engine 2 and electric drive 4 can be coupled to one another via a common drive shaft 6. With the aid of a first controllable coupling 7 situated between internal combustion engine 2 and electric drive 4, it is possible to produce or detach the coupling between internal combustion engine 2 and electric drive 4, depending on whether internal combustion engine 2 is to make a contribution for providing the drive moment or not. In further specific embodiments, first coupling 7 can also be omitted. In addition, drive train 6 can be coupled to a manual transmission 9 via a second controllable coupling 8. For this purpose, second coupling 8 is situated between electric drive 4 and manual transmission 9. At the output side of manual transmission 9, the drive train is connected to drive wheels (not shown) of the motor vehicle that is to be driven.

Manual transmission 9 is fashioned to set a corresponding driving gear, controlled by a switching signal. For this purpose, second coupling 8 and manual transmission 9 are connected to a transmission control device 10 that, in order to carry out a switching process, decouples second coupling 8 and sets the driving gear corresponding to a specified gear in order then to re-couple second coupling 8.

In addition, a hybrid control device 11 is provided that, based on state quantities of drive train 6 or of internal combustion engine 2 and/or of electric drive 4, controls a load distribution or an activation state (start/stop operation) of internal combustion engine 2, so that a requested drive moment is provided through corresponding partial moments, indicated by the load distribution, of internal combustion engine 2 and electric drive 4. In addition, hybrid control device 11 can control a suitable strategy for recharging electrical energy storage device 5 in a recuperation operating mode or in a generator operating mode of electric drive 4. Hybrid control device 11 and transmission control device 10 can also be combined together in one control device.

In addition, it can be provided that in hybrid control device 11 the momentary operating point is ascertained based on a prespecified driver's desired torque, the electrical energy available in electrical energy storage device 5, and the chemical energy available in fuel tank 3, using an optimization function. The operating point can in particular be indicated by the load distribution of a drive moment, or a partial load, of internal combustion engine 2, and/or by the rotational speed of hybrid drive system 1. As actuating quantities that provide the optimization function in hybrid control device 11, there results the load distribution, which indicates the distribution of the partial moments that are to be provided by the drive units for providing an overall torque. For this purpose, hybrid control device 11 can obtain further state quantities from drive units 2, 4 and from the overall hybrid drive system 1, such as an indication concerning the gear selected in the transmission. The optimization takes place, generally, by minimizing costs, which are indicated by a cost function. In addition, special function requests can occur that correspond to requests for the execution of a particular special function. In order to carry out these special functions, hybrid drive system 1 is in each case operated in a particular operating range for a prespecified time duration, so that the temporally limited special function can be executed completely. The particular operating range required by the special functions standardly differs from the optimized operating point required by the above-indicated conventional optimization.

Special functions are functions that, during operation of hybrid drive system 1, are to be carried out, or should be carried out, in particular driving situations and/or in particular vehicle situations and/or with a particular frequency or regularity. The special functions can include diagnostic functions, calibration functions, component protection functions, temperature adaptation functions for individual components, and the like. These special functions can for example include one or more of the following functions:

- a temporally optimized catalytic converter heating function that provides a fastest possible heating of a catalytic converter of an internal combustion engine 2 while maintaining an emission limit;
- an emission-optimized catalytic converter heating function that provides a heating of a catalytic converter of internal combustion engine 2 while minimizing an emission of pollutants;
- a function for temperature adaptation of a lambda sensor before or after the catalytic converter;
- a catalytic converter heat-keeping function;
- a moment calibration function for calibrating the torques of the internal combustion engine;
- a catalytic converter diagnostic function for diagnosing the functional capacity of the catalytic converter;
- a lambda sensor diagnostic function for diagnosing the functional capacity of the lambda sensor;
- a mixture adaptation function;
- a thermostat diagnostic function and engine temperature sensor diagnostic function;
- a diagnostic function for recognizing misfires;
- a function for cylinder-specific air-fuel adaptation;
- a function for diagnosing the operation of a tank ventilation system for reducing outgassing emissions;
- a function for carrying out a leakage diagnosis of the tank system;
- a function for reducing a raw emission component, such as NOx;
- a function for reducing an emission component, such as NOx;
- a function for regeneration of a storage catalytic converter; and
- a function for regeneration of a filter, e.g. a particle filter.

Each of these special functions requires the assumption of a particular operating range by internal combustion engine 2, or by hybrid drive system 1. The particular operating ranges for the individual special functions are specified by boundary conditions such as engine rotational speed ranges, load ranges, or air mass ranges, or other operating states, such as unfired operation or stop operation of the internal combustion engine.

However, it is frequently the case that at the time of the special function request, the operating point of hybrid drive system 1 that is optimized with regard to energy usage is not in the relevant determined operational range.

In addition, as a rule the special functions have to be carried out at particular times, or at regular or prespecified time intervals, and additionally require that the then-assumed operating point of hybrid drive system 1 remains within the particular operating range assigned to the special function for a prespecified time duration assigned to the special function.

In addition, a corresponding partial cost function $TK_i$ that corresponds to a prioritization function for the requesting of the nth special function is assigned to the special functions. The partial cost function is a function of an operating point of hybrid drive system 1, and determines a cost reduction for a cost function. The amount of the partial cost function can be not equal to 0 in particular for operating points within the operating ranges assigned to the special function, and can be 0 for operating points outside the operating ranges assigned to the special function.

In addition, each special function can be assigned a parallel execution item of information that indicates whether the corresponding functionality can be executed in parallel with other special function requests, or excludes other special function requests.

Figure 2:
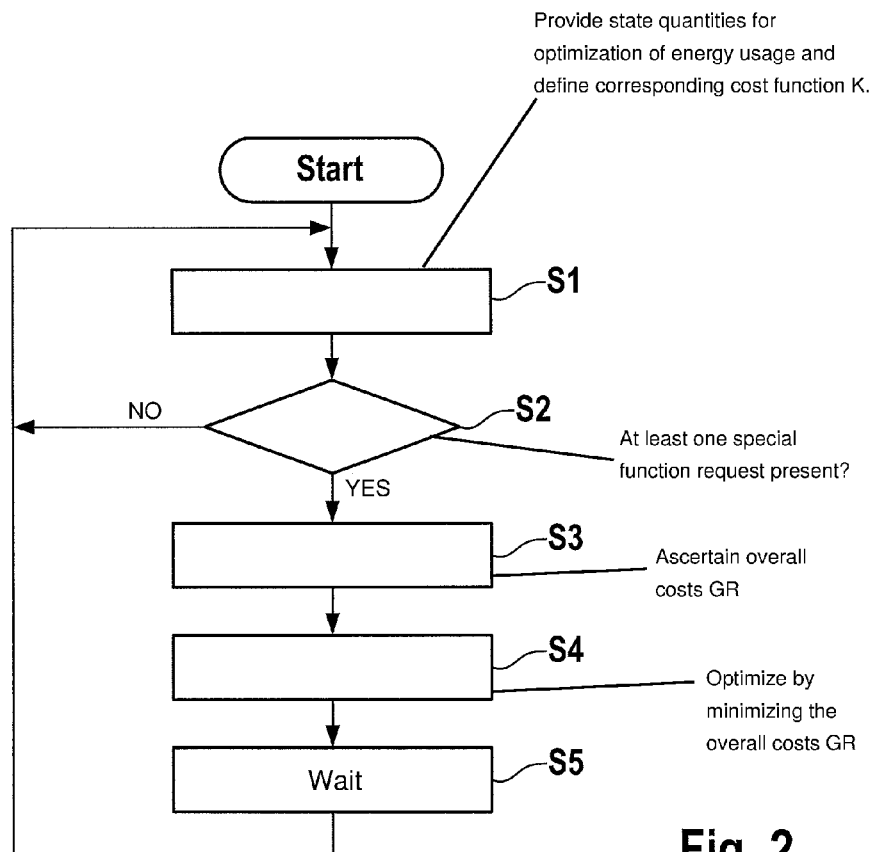
FIG. 2 shows a flow diagram illustrating the method for operating a hybrid drive system of FIG. 1.

FIG. 2 shows a flow diagram illustrating a method for operating a hybrid drive system 1, on the basis of a flow diagram.

First, in step S1 the state quantities necessary for an optimization of the energy usage, such as the specified driver's desired torque, as well as indications concerning the available electrical and chemical quantities of energy in electrical energy storage unit 5 and fuel tank 3, are provided, and a corresponding cost function K is defined.

In step S2 it is checked whether at least one special function request is present for the execution of the special function. If this is the case (alternative: yes), the method continues with step S3; otherwise (alternative: no) the method continues with step S1.

In step S3, overall costs GK are ascertained using an overall cost function that ascertains a sum of the costs K of the conventional cost function and the partial costs TKi of the partial cost functions assigned to the requested special function, corresponding to $$GK = K + \sum_{i=1}^{n} TKi.$$

The partial cost functions, which are a function of the operating point, can in each case specify a reduction of the costs K of the cost function, which are a function of the operating point, corresponding to the importance or priority of the respectively requested special function. This importance or priority can in addition be a function of time, and can in particular increase the longer it has been since the last execution of the relevant special functions.

In addition, it can be provided that the partial cost function assigned to one of the requested special functions assumes a very large amount, in particular for operating points within the operating range assigned to one of the requested special functions, which has a large influence on the overall costs GK during the optimization in the operating range assigned to the special function, and for operating points outside the operating ranges assigned to the special function assumes the value 0, or even a value that increases the overall costs GK. In this way, the optimization on the basis of the overall cost function yields in each case an operating point within the operating range assigned to the one special function. In this way, it is ensured that the relevant special function is carried out in each case. This can for example relate to the special function for carrying out a catalytic converter heating operation after the start of the internal combustion engine (2).

In step S4, an optimization is carried out by minimizing the overall costs GK of the overall cost function created in step S3. There results a particular operating point that on the one hand optimizes the energy usage in accordance with the specified conventional cost function, and on the other hand appropriately takes into account the existing special function requests. Through the provision of the time-dependent partial cost functions for the special functions, the importance or priority of the carrying out of a requested special function can be made a function of a time duration that has elapsed since the previous execution of the special function, so that it can be ensured that corresponding special functions that are to be carried out regularly are guaranteed to be carried out again after the expiration of a prespecified time duration.

With regard to the special functions of the catalytic converter heating operation, this can be requested immediately after the first-time activation of internal combustion engine 2. Depending on the boundary condition, it can then be decided which of the catalytic converter heating operation functions is set, namely the catalytic converter heating function optimized with respect to time or that optimized with respect to emissions.

Because the execution of the special functions requires in each case a prespecified time duration, in step S5 it can be provided that before a new check for requested special functions, first a prespecified time duration is waited. However, the waiting can be interrupted if a change of load is for example requested by the driver that forces a departure from the previously selected operating point.

The parallel execution of those requested special functions is automatically ensured if, from the optimization based on the overall cost function, there results an operating point of hybrid drive system 1 that is within the operating range assigned to the relevant special function. This holds for those requested special functions that, in accordance with the respectively assigned parallel execution information, can also be executed in parallel. If the parallel execution information indicates for one or more of the requested special functions that these are capable of being executed only exclusively, then a prioritization or sequence of the execution of the special functions is determined through comparison of the resulting partial costs for all requested special functions at the particular operating point. In particular, that special function for which the parallel execution information prescribes exclusive execution is carried out if the amount of the partial costs assigned thereto is higher than the respective amounts of the partial costs assigned to the other requested special functions.

In order to reduce the computing expense, the special function requests can also be defined as a combination of special functions that can always be executed together. In addition, it is possible to define the partial cost functions of the individual special functions in each case as a function of the trip duration, the operating duration of internal combustion engine 2, and an item of information as to whether the requested special function was taken into account in the last driving cycle.

In addition, it can be provided that the cost function also takes into account predictive state quantities, so that the cost function takes into account future operating states that for example take into account a topography or curve radii of a travel route that is to be traveled. The topography or curve radii can be provided from a navigation system.

What is claimed is:

1. A method for operating a hybrid drive system comprising:
    ascertaining an overall cost function that takes into account a cost function which is a function of an operating point for minimizing an energy usage of the hybrid drive system, and that takes into account one or more partial cost functions which are a function of the operating point, which are each assigned to a requested special function;
    determining an optimized operating point of the hybrid drive system corresponding to an optimization of overall costs according to the ascertained overall cost function;
    operating the hybrid drive system at the operating point; and
    executing those of the requested special functions for which the determined operating point is within an operating range assigned to the respective special function.

2. The method as recited in claim 1, wherein the operating point is determined at least through a load distribution between drive units of the hybrid drive system and through a rotational speed of the hybrid drive system.

3. The method as recited in claim 1, wherein the requested special functions are functions that, during operation of the hybrid drive system, are to be carried out at least one of: i) in particular driving situations, ii) in particular vehicle situations and iii) with a particular frequency or regularity, and include at least one of: i) diagnostic functions, ii) calibration functions, iii) component protection functions, and iv) temperature adaptation functions for individual components.

4. The method as recited in claim 3, wherein the special functions include at least one of the following functions:
   a temporally optimized catalytic converter heating function that provides a fastest possible heating of a catalytic converter of an internal combustion engine while maintaining an emission limit;
   an emission-optimized catalytic converter heating function that provides a heating of a catalytic converter of the internal combustion engine while minimizing an emission of pollutants;
   a function for temperature adaptation of a lambda sensor before or after the catalytic converter;
   a catalytic converter heat-keeping function;
   a moment calibration function for calibrating the torques of the internal combustion engine;
   a catalytic converter diagnostic function for diagnosing the functional capacity of the catalytic converter;
   a lambda sensor diagnostic function for diagnosing the functional capacity of the lambda sensor;
   a mixture adaptation function;
   a thermostat diagnostic function and engine temperature sensor diagnostic function;
   a diagnostic function for recognizing misfires in a combustion in a cylinder of the internal combustion engine;
   a function for cylinder-specific air-fuel adaptation;
   a function for diagnosing the operation of a tank ventilation system for reducing outgassing emissions;
   a function for carrying out a leakage diagnosis of the tank system;
   a function for reducing a raw emission component;
   a function for reducing an emission component;
   a function for regeneration of a storage catalytic converter; and
   a function for regeneration of a filter.

5. The method as recited in claim 1, wherein the operating ranges of the hybrid drive system assigned to the special functions are determined by at least one of the following parameters: rotational speed range, load range, air mass range, operating states such as coasting operation and stop operation of the internal combustion engine.

6. The method as recited in claim 1, wherein the partial cost functions assigned to the special functions are taken into account in the overall cost function in such a way that the partial costs, which are a function of the operating point, resulting therefrom reduce the overall costs resulting from the overall cost function.

7. The method as recited in claim 1, wherein the amount of the partial costs of the partial cost function, which is a function of the operating point, of a special function assumes a value that differs from 0 and that reduces the overall costs for operating points within the one or more operating ranges assigned to the special function, and assumes the value of 0 or a value that increases the overall costs for operating points outside the one or more operating ranges assigned to the special function.

8. The method as recited in claim 1, wherein the ascertaining of the overall costs by the overall cost function and the determining of the optimized operating point are carried out cyclically, a prespecified time duration assigned to the special function being carried out being waited in particular before a renewed ascertaining of the overall cost function, the waiting being in particular interrupted if a change of load is requested that requires a departure from the operating point of the hybrid drive system.

9. The method as recited in claim 1, wherein an item of parallel execution information is assigned to each special function that indicates whether the corresponding functionality is capable of being carried out in parallel with further requested special functions, or excludes other requested special functions.

10. The method as recited in claim 9, wherein, if the parallel execution information for one or more of the requested special functions indicates that these are permitted to be carried out only exclusively, a sequence of the execution of the special functions is determined as a function of the partial costs, which are a function of the operating point, assigned to the requested special functions.

11. The method as recited in claim 1, wherein the partial cost functions of the individual special functions being a function respectively of a trip duration, of an operating duration of the internal combustion engine, and of an item of information concerning whether the requested special function was taken into account in a last driving cycle.

12. The method as recited in claim 1, wherein the cost function also takes into account predictive state quantities.

13. A hybrid control device for operating a hybrid drive system, the device being configured to:
   ascertain an overall cost function that takes into account a cost function which is a function of an operating point for minimizing an energy usage of the hybrid drive system, and that takes into account one or more partial cost functions which are a function of the operating point, which are each assigned to a requested special function;
   determine an optimized operating point of the hybrid drive system corresponding to an optimization of overall costs according to the ascertained overall cost function;
   operate the hybrid drive system at the operating point; and
   execute those of the requested special functions for which the determined operating point is within an operating range assigned to the respective special function.

14. A machine-readable storage medium on which a computer program is stored, the computer program, when executed by a data processing device, causing the data processing device to perform:
   ascertaining an overall cost function that takes into account a cost function which is a function of an operating point for minimizing an energy usage of the hybrid drive system, and that takes into account one or more partial cost functions which are a function of the operating point, which are each assigned to a requested special function;
   determining an optimized operating point of the hybrid drive system corresponding to an optimization of overall costs according to the ascertained overall cost function;
   operating the hybrid drive system at the operating point; and executing those of the requested special functions for which the determined operating point is within an operating range assigned to the respective special function.

* * * * *